Oct. 6, 1970  E. ROOS  3,532,367
PIPE COUPLINGS
Filed Feb. 18, 1969  2 Sheets-Sheet 2
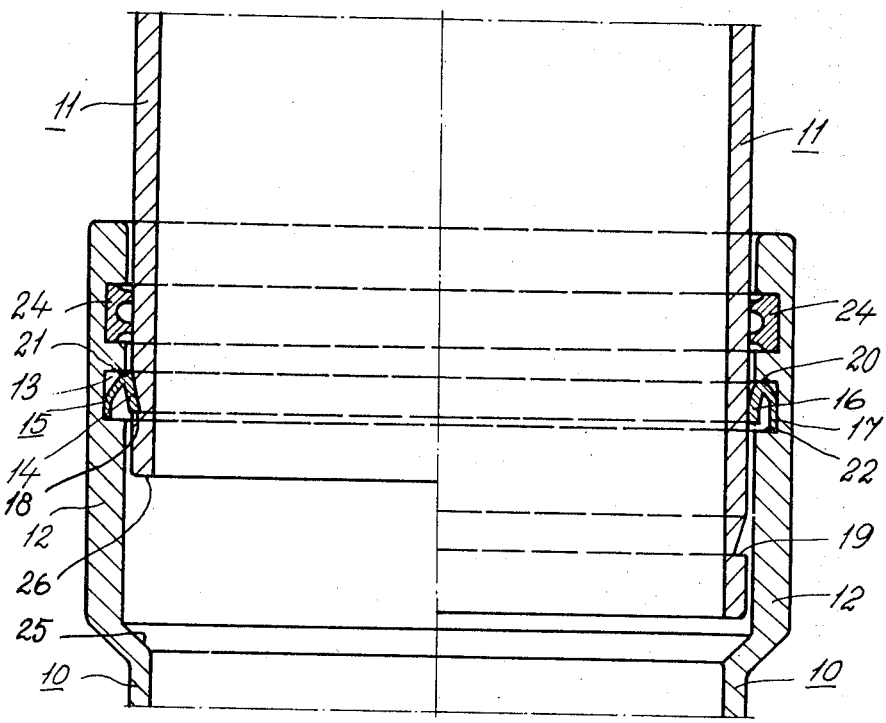
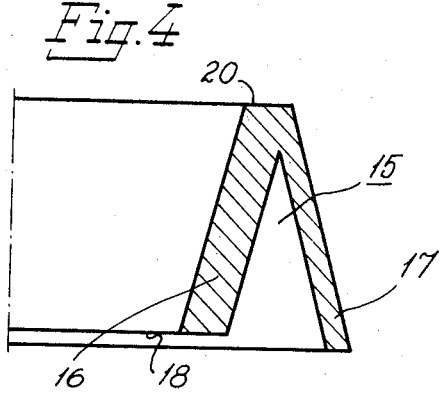

3,532,367
PIPE COUPLINGS
Erling Roos, Rotebro, Sweden, assignor to Metallverken Essem Plast AB, Upplands, Vasby, Sweden
Filed Feb. 18, 1969, Ser. No. 800,130
Claims priority, application Sweden, Feb. 19, 1968, 2,151/68; July 5, 1968, 9,332/68
Int. Cl. F16l 27/12
U.S. Cl. 285—302
4 Claims

ABSTRACT OF THE DISCLOSURE

An improvement in pipe couplings intended to couple two pipes of which one presents a portion which, when the pipes are coupled, extends over the other pipe, and each of which presents on opposing sides thereof in coupled position at least one circumferential open groove. A coupling element, which is retained in the groove in one pipe, presents a portion which is essentially in the form of a frusto-control ring having a resilient part projecting out of the retaining groove and adapted to snap into the groove in the other pipe, the projecting part of the portion and the groove of the other pipe presenting substantially radial surfaces, which are adapted to co-act to prevent the two pipes from being separated in a direction opposite to that in which they are coupled. At least one resilient member extends from the portion at a position considerably remote from the projecting part thereof, at an acute angle to and with its free end portion abutting the bottom of the retaining groove, to center the coupling element in relation to the one pipe.

---

The present invention relates to a means for coupling together two pipes, of which one pipe presents a portion which, when the pipes are coupled, extends over the other pipe, and each of which presents on opposing sides thereof in coupled position at least one circumferential open groove, and wherein a coupling element, which is retained in the groove in one pipe, presents a portion which is essentially in the form of a frusto-conical ring having a resilient part projecting out of the retaining groove and adapted to snap into the groove in the other pipe, the projecting part of said portion and the groove of said other pipe presenting substantially radial surfaces, which are adapted to co-act to prevent the two pipes from being parted in a direction opposite to that in which they are coupled.

An object of the present invention is to provide a novel and reliable pipe coupling of the afore-described type, which enables two pipes to be united rapidly by simple hand movements.

The coupling means according to the invention is characterized in that at least one resilient member extends from said portion at a position substantially remote from its projecting part at an acute angle to and with its free end portion abutting the bottom of the retaining groove, to center the coupling element in relation to said one pipe. This arrangement does not require any high degree of accuracy with respect to the pipes and the grooves disposed therein, and pipes having a high coefficient of expansion, such as plastic pipes, can be coupled together reliably. The coupling according to the invention is primarily conceived for uniting plastic pipes of moderate dimensions, particularly pipes made of plastic materials, for instance, polyolefines, which are difficult or impossible to join together by adhesive bonding processes. Accordingly, the coupling according to the invention may be used with particular advantage for coupling polyethylene pipes having a diameter within the region of from about one-half decimeter to a few decimeters. It is to be understood, however, that the coupling according to the invention can also be used to unite pipes made of other materials and having other dimensions.

The invention will now be described in detail with reference to a number of embodiments thereof shown in the accompanying drawing, additional characteristic features of the invention being disclosed in conjunction therewith.

Figure 1:
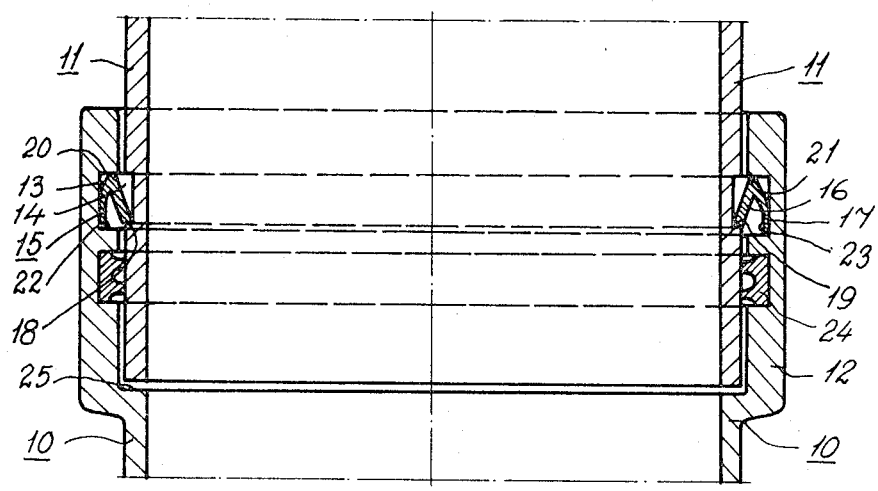
Figure 2:
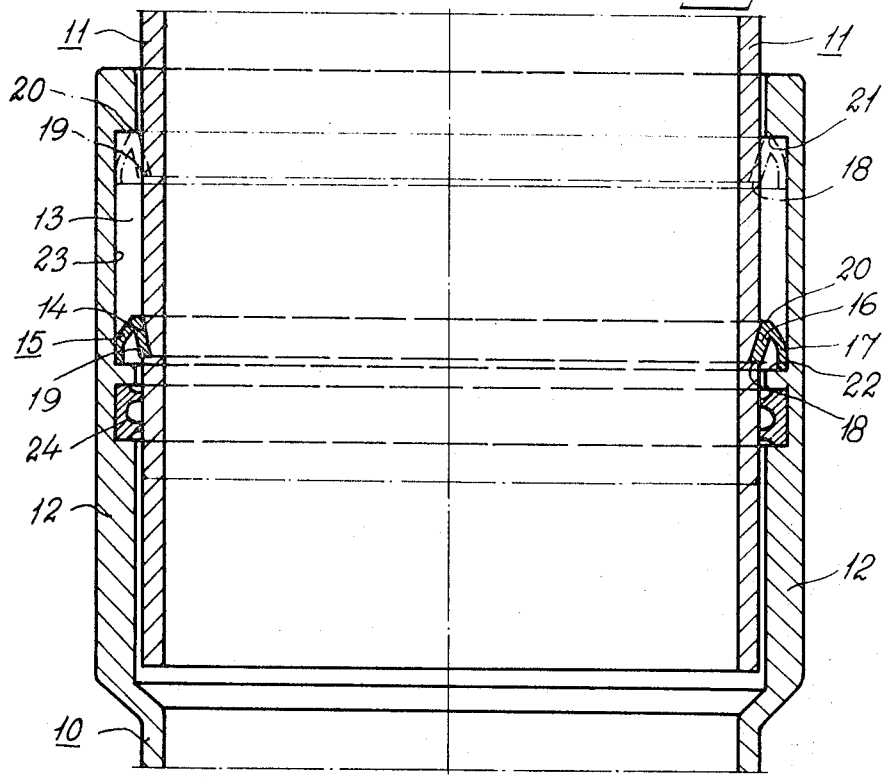

In the drawings, FIGS. 1, 2 and 3 are axial sectional views of different embodiments of the means for coupling two pipes in accordance with the invention, and FIG. 4 is a cross sectional view of the coupling element shown in FIGS. 1 to 3 when not subjected to load.

In FIGS. 1, 2 and 3 are shown two pipes, 10 and 11 respectively, of which only portions thereof are shown and which are coupled together by means of a coupling arrangement according to the invention. The pipe 10 has a flared portion 12 which projects over the pipe 11. In the opposing surfaces of the pipes 10 and 11, are disposed open grooves 13 and 14. A coupling element 15, suitably of a monolithic structure and made of a preferably hard, although resilient, plastic material, is retained in groove 13 and presents a portion 16 which is substantially in the form of a frusto-conical ring and has a resilient member 17. The member 17 will be described in more detail below. The ring 16 presents a radial, undivided end surface 18, adapted to co-act with a radial defining surface 19 of the groove 14, to prevent the pipes 10, 11 from being separated in a direction opposite to that in which they are coupled. The ring 16 presents an inner diameter at the base thereof which is generally equal to and preferably somewhat larger than the inner diameter of the flared portion 12, so that the radial, undivided base surface 20 rests in its entirety against the radial defining wall 21 of the groove 13, to prevent the element 15 from being drawn axially out of the flared portion, and to permit passage of the pipe 11 past the base surface 20. The conicity of the ring 16 is such that when not subjected to load the smallest diameter is essentially equal to or preferably less than the diameter of the radial inner end of the groove wall 19, so that the part of the coupling element projecting out of the groove 13 snaps into the groove 14 when the pipes 10 and 11 are brought together. The resilient member 17, which is adapted to co-act with the groove 13 to center the ring 16 in relation to the flared portion 12 and, by engagement between the free end of the member 17 and a defining wall 22 of groove 13 opposite the wall 21, prevent axial displacement of the coupling element beyond the groove 13 into the flared portion 12, extends away from the ring 16 at a position remote from the end 18 thereof and at an acute angle to the bottom 23 of the groove 13, against which the member 17 abuts resiliently along a portion of its length. The member 17 may, to advantage, depart from the end 20 of the ring 16 in the shown manner. Owing to the fact that the member 17 resiliently abuts the bottom 23 of the groove 13 at a position remote from the position at which its joins the ring 16, said ring 16 is centered in relation to the portion 12 and does not require the groove 13 to be cut with any high degree of precision. The member 17 is suitably in the form of an undivided, annular collar. Alternatively, however, a number of members in the form of tongues extending angularly away from the ring 16 may be arranged instead.

It should be understood that the ring 16 must normally be capable of taking up considerable axial loads and resist forces which attempt to wrench the same from the groove 13. The coupling element should therefore consist of a relatively hard, resilient material. To enable the coupling element 15 to be mounted in the associated groove 13 without undue effort, the ring is made relatively thin, although the thickness of the ring 16, when viewed radially, should exceed that of the member 17. Particularly when the member 17 is in the form of an annular collar, the ring 16 is stiffened in an advantageous manner without impairing the ability of the ring to snap into the groove 13 when coupling pipes 10, 11 together.

In the embodiment shown in FIGS. 1 and 2, an annular seating or groove for an elastic sealing ring 24 is arranged in the inner wall of the flared portion 12, in front of the groove 13 when viewed from the mouth of the flared portion. Alternatively, as shown in FIG. 3, the sealing ring may be arranged in a groove situated between the groove 13 and the mouth of the flared portion, or it can be accommodated in the groove 13 retaining the coupling element 15, the member 17 supporting against the radial wall 22 of the groove 13 via the sealing ring. In another embodiment, the sealing ring may be arranged at the axial inner end of the flared portion, and rest against abutment surface 25 (FIG. 1), to be squeezed between said surface and the end surface of the pipe 10, so as to give rise to an axial force which, when the pipes are coupled together, attempts to move them apart.

As can be seen from FIGS. 1 to 3, the sealing ring 24 tapers towards the ends thereof, so that pipes 10, 11 can be united without risk of the inserted sealing ring 24 being wrenched or pushed from its seating or groove. Furthermore, the sealing ring may present, to advantage, in the surface remote from the groove retaining the same, at least one circumferential groove which the material of the sealing ring, depending, for instance, upon the distance between the opposing walls of pipes 10, 11, can fill to a greater or lesser extent.

In view of the fact that the depth of the grooves accommodating the coupling element 15 is normally quite considerable in comparison with the thickness of the pipe 10, it may be expedient to reinforce the side of the pipe opposite the groove 13. For instance, a shallow groove can be arranged opposite the groove 13 on the outside of the portion 12, and a circumferentially extending reinforcing ring be inserted in said groove. Thus, in accordance with a practical example of the invention, pipes 10 and 11 may be made of HD polyethylene plastic and the coupling element of acetal plastic, and a metal ring may be shrunk-fitted onto the outside of pipe 10, opposite the groove 13.

In the embodiment shown in FIG. 1, the groove 13 has an axial length which substantially coincides with the distance between the surface 20 of the ring 16 and the free end of the resilient member 17, so that the coupling elemnt 15, by engagement between firstly the end surface 20 and said free end and secondly the side walls 21 and 22 of the groove 13, is retained substantially axially immovable in the groove 13. In this respect, the ring 16 when not subjected to load should have an axial length somewhat less than the axial length of the groove 13, so that it can move into said groove. The axial length of member 17 should, however, be equal to or slightly exceed the axial length of the groove 13. FIG. 4 shows a cross section of the coupling element 15, from which it can clearly be seen that the member 17 is longer than the ring 16. Furthermore, FIG. 1 shows that the length of the member 17 exceeds the axial length of groove 13.

In the embodiment shown in FIG. 2, the groove 13 retaining the coupling element 15 has an axial length which exceeds the axial length of the coupling element 15. In this way, pipes 10, 11 when coupled together have a restricted degree of axial relative movement, so that changes in length of pipes 10, 11, caused by variations in temperature for instance, can be taken up in the coupling. To enable increases and decreases in length to be taken up in the coupling, the pipes 10, 11 subsequent to being coupled are suitably moved to a position in which the groove 14, presenting a triangular cross-section, is located at a distance from the two radial defining walls 21, 22 of the groove 13, so that with linear expansion of the pipes they approach or adopt the position in which the coupling element 15 is located in the position shown with full lines, and when decreasing in length, approach or adopt the position in which the end surface 20 of the ring 16 is in contact with the defining wall 21 of the groove 13, and the coupling element 15 is thus located in the position shown by dotted lines. Variations in length of the pipes 10, 11 can also be taken up in the coupling shown in FIG. 3. In this embodiment, the groove 13 is constructed in the same way as in the embodiment shown in FIG. 1. To enable both increases and decreases in length to be taken up in the coupling, the pipes 10, 11, subsequent to being united, are conveniently moved to a position in which the end surface 26 of the pipe 11 is located between the position shown to the left in FIG. 3 and the position in which the end surface 26 contacts the internal abutment surface 25 of the pipe 10. To the right of FIG. 3 is shown pipes 10, 11 in such an intermediate position. In the embodiment shown in FIG. 3, the ring is thus swung into the groove 13, in which it is normally accommodated substantially in its entirety. In this embodiment it is important that the coupling element 15 possesses good and permanent spring characteristics, so that the ring 16 positively snaps back into the groove 14 when the pipes 10, 11 adopt the position shown to the left in FIG. 3.

The invention is not restricted to the embodiments described and illustrated in the drawing, but can be modified within the scope of the invention, with respect both to the construction of the grooves and to the coupling element and the arrangement of the seal. In this regard, it can be mentioned that more than one coupling element with associated grooves similar to grooves 13 and 15 can be arranged, and that the coupling element can be retained in a groove in the inner pipe.

What is claimed is:

1. Apparatus for coupling together two pipes, of which one pipe includes an enlarged portion which, when the pipes are coupled, extends over the other pipe, each of said pipes having on opposing sides thereof in coupled position one circumferential open groove, a coupling element retained in the groove in one pipe and including a portion essentially in the form of a frusto-conical ring with a resilient part projecting out of the retaining groove and adapted to snap into the groove in the other pipe, the projecting part of said portion and the groove of said other pipe having substantially radial surfaces adapted to co-act to prevent the two pipes from being separated in a direction opposite to that in which they are coupled, said resilient member further including at least one resilient portion in the form of an annular collar extending from said frusto-conical ring portion at a position considerably remote from the projecting part thereof and at an acute angle to and with its free end portion abutting the bottom of the retaining groove to center the coupling element in relation to said one pipe, said frusto-conical ring portion having a greater thickness than said annular collar, one of said pipes having a second circumferential groove therein facing the other pipe and axially spaced from the first groove therein, and an elastic sealing ring in said second groove to provide a seal between the pipes.

2. Apparatus as claimed in claim 1 where the coupling element retaining groove is in said enlarged portion extending over said other pipe.

3. Apparatus as claimed in claim 1 where the coupling element retaining groove has an axial length which essentially coincides with the distance between the end surface of said portion of the coupling element accommodated in the retaining groove and the free end of the annular collar, so that the coupling element, by engagement of said end surface and said free end with the side walls of the retaining groove is retained substantially axially immovable.

4. Apparatus as claimed in claim 1 wherein the coupling element retaining groove has an axial length which exceeds the axial length of the coupling element.

References Cited

UNITED STATES PATENTS

| | | | |
|---|---|---|---|
| 1,905,324 | 4/1933 | Waters | 285—104 |
| 2,177,184 | 10/1939 | Martin et al. | 285—104 X |
| 2,465,197 | 3/1949 | Chatham | 285—105 X |
| 3,447,819 | 6/1969 | Borsum et al. | 285—321 X |

DAVE W. AROLA, Primary Examiner

U.S. Cl. X.R.

285—321